United States Patent
Song et al.

(10) Patent No.: US 7,581,215 B1
(45) Date of Patent: Aug. 25, 2009

(54) DEPENDENCY ANALYSIS SYSTEM AND METHOD

(75) Inventors: Yonghong Song, South San Francisco, CA (US); Xiangyun Kong, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 568 days.

(21) Appl. No.: 10/876,228

(22) Filed: Jun. 24, 2004

Related U.S. Application Data

(60) Provisional application No. 60/483,809, filed on Jun. 30, 2003.

(51) Int. Cl.
*G06F 9/45* (2006.01)

(52) U.S. Cl. .................. 717/160; 717/159; 717/161

(58) Field of Classification Search .............. 717/150, 717/160, 161
See application file for complete search history.

(56) References Cited

U.S. PATENT DOCUMENTS

| | | | | |
|---|---|---|---|---|
| 4,833,606 | A * | 5/1989 | Iwasawa et al. | 717/160 |
| 5,317,734 | A * | 5/1994 | Gupta | 717/161 |
| 5,842,022 | A * | 11/1998 | Nakahira et al. | 717/160 |
| 5,852,734 | A * | 12/1998 | Komatsu et al. | 717/156 |
| 5,901,318 | A * | 5/1999 | Hsu | 717/161 |
| 5,974,538 | A * | 10/1999 | Wilmot, II | 712/218 |
| 6,282,704 | B1 | 8/2001 | Iitsuka | |
| 6,374,403 | B1 | 4/2002 | Darte et al. | |
| 6,516,463 | B2 * | 2/2003 | Babaian et al. | 717/156 |
| 6,615,403 | B1 * | 9/2003 | Muthukumar et al. | 717/160 |
| 6,651,246 | B1 * | 11/2003 | Archambault et al. | 717/160 |
| 2004/0098711 | A1 * | 5/2004 | Song et al. | 717/150 |
| 2004/0123280 | A1 * | 6/2004 | Doshi et al. | 717/161 |

OTHER PUBLICATIONS

U Pugh et al., "Constraint-Based Array Dependency Analysis", ACM, pp. 635-678, 1998.*
V Pugh et al. "Nonlinear Array Dependency Analysis", University of Maryland, College Park, MD, pp. 1-11, 1994.*
Pugh et al., "Constraint-Based Array Dependency Analysis," ACM, pp. 635-678, 1998.
Pugh et al., "Nonlinear Array dependency Analysis," University of Maryland, College Park, Maryland, pp. 1-11, 1994.

* cited by examiner

*Primary Examiner*—Wei Y Zhen
*Assistant Examiner*—Matthew J Brophy
(74) *Attorney, Agent, or Firm*—Dorsey & Whitney LLP

(57) ABSTRACT

We present a technique to perform dependence analysis on more complex array subscripts than the linear form of the enclosing loop indices. For such complex array subscripts, we decouple the original iteration space and the dependence test iteration space and link them through index-association functions. The dependence analysis is performed in the dependence test iteration space to determine whether the dependence exists in the original iteration space. The dependence distance in the original iteration space is determined by the distance in the dependence test iteration space and the property of index-association functions. For certain non-linear expressions, we show how to transform it to a set of linear expressions equivalently. The latter can be used in dependence test with traditional techniques. We also show how our advanced dependence analysis technique can help parallelize some otherwise hard-to-parallelize loops.

29 Claims, 5 Drawing Sheets

DEPENDENCY ANALYSIS SYSTEM AND METHOD

CROSS-REFERENCE TO RELATED APPLICATION(S)

This non-provisional patent application claims benefit under 35 U.S.C. §119(e) of the earlier filing date of Provisional Application No. 60/483,809, filed on Jun. 30, 2003, naming Yonghong Song and Xiangyun Kong as inventors.

BACKGROUND

1. Field of the Invention

The present invention relates generally to execution sequence dependency analysis and, more particularly, to cross-iteration dependency and loop parallelization techniques that facilitate preparation and/or optimization of program code.

2. Description of the Related Art

To exploit parallel execution facilities provided by multiprocessor and multi-core computers, some types of program code demand effective loop transformation and/or automatic parallelization techniques. In general, dependence analysis forms a basis for automatic parallelization and for some loop transformations.

Conventional dependence analysis techniques can often be employed for simple loop transformations and automatic parallelization. For example, consider the following simple loop:

do i=1, 100, 3
     A(i+8)=A(i)+1
   end do

In order to parallelize the loop, it is important to make sure that A (i+8) does not carry cross-iteration dependence with respect to A (i+8) and A (i).

A variety of conventional techniques have been developed for loops, such as the simple loop above, where array subscripts are linear functions of the enclosing loop indices. Often these techniques, such as a GCD test, Banerjee test, or Fourier-Motzkin test may be successfully employed to determine whether two array references, e.g., A (i+8) in one iteration and A (i) in another, reference the same array location. For example, these techniques are able to determine that the simple loop illustrated above is a DOALL loop, which can be parallelized. However, many loops can contain complex subscripts that are beyond the capabilities of the conventional techniques. One such complexity is presented when an array subscript is a non-linear function of an enclosing loop index.

Since the conventional techniques target the linear subscripts (of loop indices), they are not able to compute dependence exactly for the following example:

do i=1, 100, 3
     j=5*i/4
     A(j+9)=A(j)+1
   end do

In order to parallelize this second, more complex loop, it is necessary to make sure that A(j+9) does not carry cross-iteration dependence with respect to A(j+9) or A(j). Conventional techniques assume a worst-case dependence between A(j+9) and A(j) and will not typically be able to parallelize the illustrated loop.

In general, techniques are desired that would allow accurate dependency analysis to be performed even for loops in which references (e.g., array subscripts) are non-linear functions of enclosing loop index. In particular, techniques are desired for loops in which the non-linear functions of enclosing loop index include division operations.

SUMMARY

It has been discovered that dependency analysis for loops in which references (e.g., array subscripts) are non-linear functions of an enclosing loop index may be accomplished by transforming the non-linear expressions to corresponding sets of linear expressions. The discovered techniques have been applied to non-linear index-association functions that include a division operator over the loop indices and region constants. Using the corresponding sets of linear expressions, dependency relations can be computed using a variety of techniques. More generally, we present a technique to handle array subscripts which contains operators including addition, subtraction, multiplication and division over the loop indices and region constants.

In one embodiment in accordance with the present invention, a compiler parallelizes a loop that includes at least two indexed accesses to storage, wherein at least one of the indexed accesses is a write access and wherein at least one of the indexed accesses indexes the storage using an expression that is itself a non-linear function of loop index.

BRIEF DESCRIPTION OF THE DRAWINGS

The present invention may be better understood, and its numerous objects, features, and advantages made apparent to those skilled in the art by referencing the accompanying drawings.

FIG. 1A depicts generation of transformed index-association functions for dependence analysis. FIG. 1B depicts an exemplary optimizer optimizing loops of a code unit based on index-association based dependence analysis.

The use of the same reference symbols in different drawings indicates similar or identical items.

DESCRIPTION OF EMBODIMENT(S)

Techniques have been developed for performing dependency analysis in functional code that includes loop constructs in which storage locations are addressed using non-linear functions of an enclosing loop index. In some exploitations, storage locations so addressed are represented as arrays, loop constructs include do loops and the exemplary non-linear functions that contribute to array index calculations include division operators. To provide a useful descriptive framework, much of the exemplary code and pseudo-code on which the developed dependency analysis techniques are illustrated is presented in the style of FORTRAN. Of course, the developed techniques may be applied in a variety of computational systems and to various functional program coding styles and environments. Use of any particular exemplary code and pseudo-code is merely illustrative and, based on the description herein, persons of ordinary skill in the art will readily adapt described techniques to other programming constructs.

Building on the developed techniques, automatic parallelization and general loop transformations can be facilitated. Accordingly, much of the description herein is made with an eye toward automatic parallelization and loop transformations. However, more generally, the techniques may be exploited in dependency analysis situations for which non-linear functions of an enclosing loop index have been limiting. Conventional dependency analysis techniques, as well as novel index-association techniques developed by the present inventors, may benefit from the developed techniques. Transformation of loops containing non-linear, indeed division-operator containing, index expressions are described herein. The description of index-association based dependence analysis, automatic parallelization and loop transformations serve as a useful descriptive context for the invented techniques and highlight certain illustrative exploitations thereof. However, such illustrative exploitations should be viewed only as useful descriptive context, as the invention is defined by the claims that follow.

Utilization of index-association based dependence analysis for parallelization of code can be partitioned into three functions. First, the dependence test iteration space is constructed. Second, dependence analysis is conducted in the constructed dependence test iteration space. Third, if dependencies are discovered in the dependence test iteration space, then dependence relations in the original iteration space are determined with the dependence relations discovered in the dependence test iteration space and the index-association function.

Figure 1A:
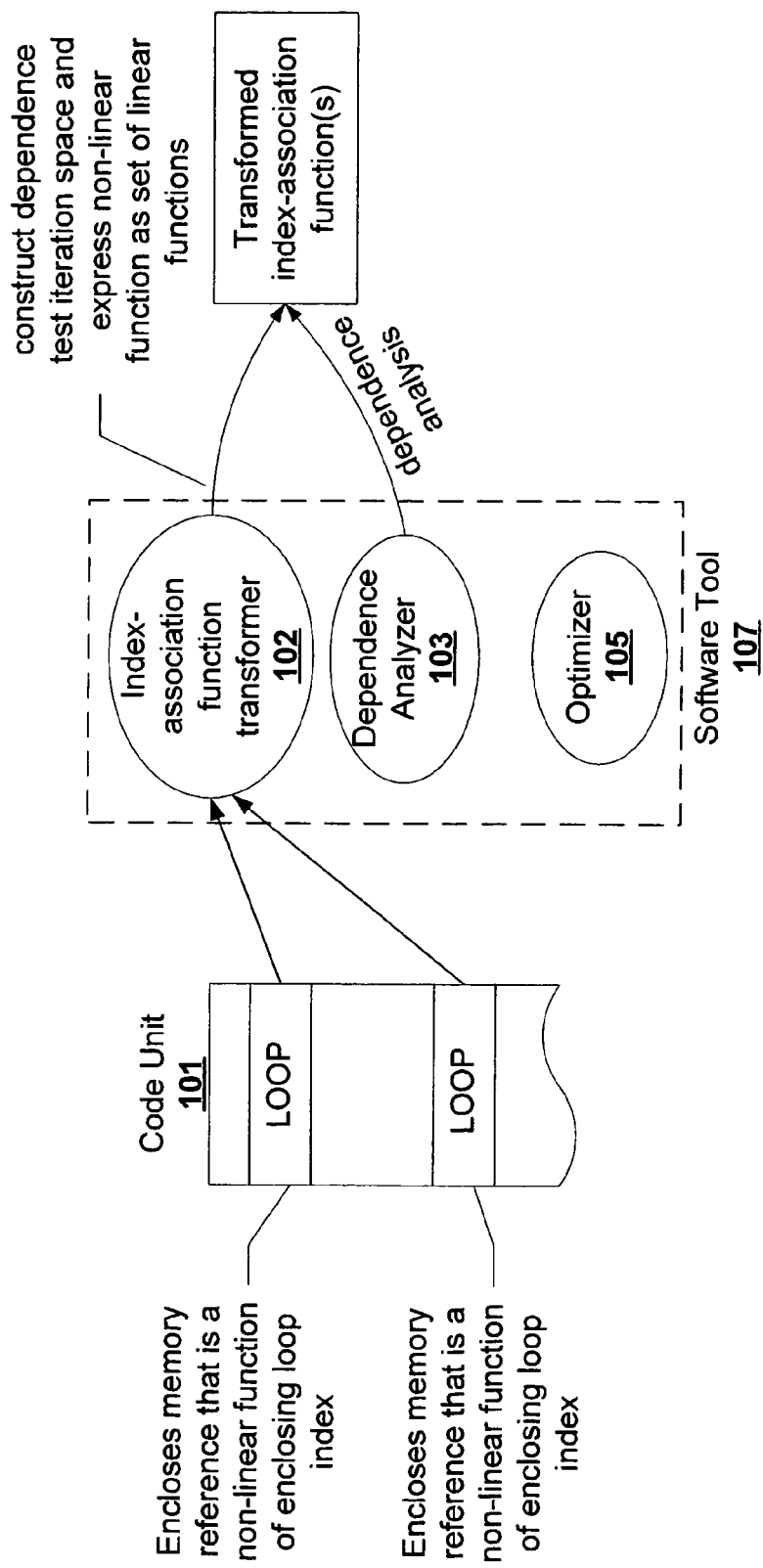
FIGS. 1A-1B depict an exemplary software tool that performs index-association based dependence analysis on a code unit.
Figure 1B:
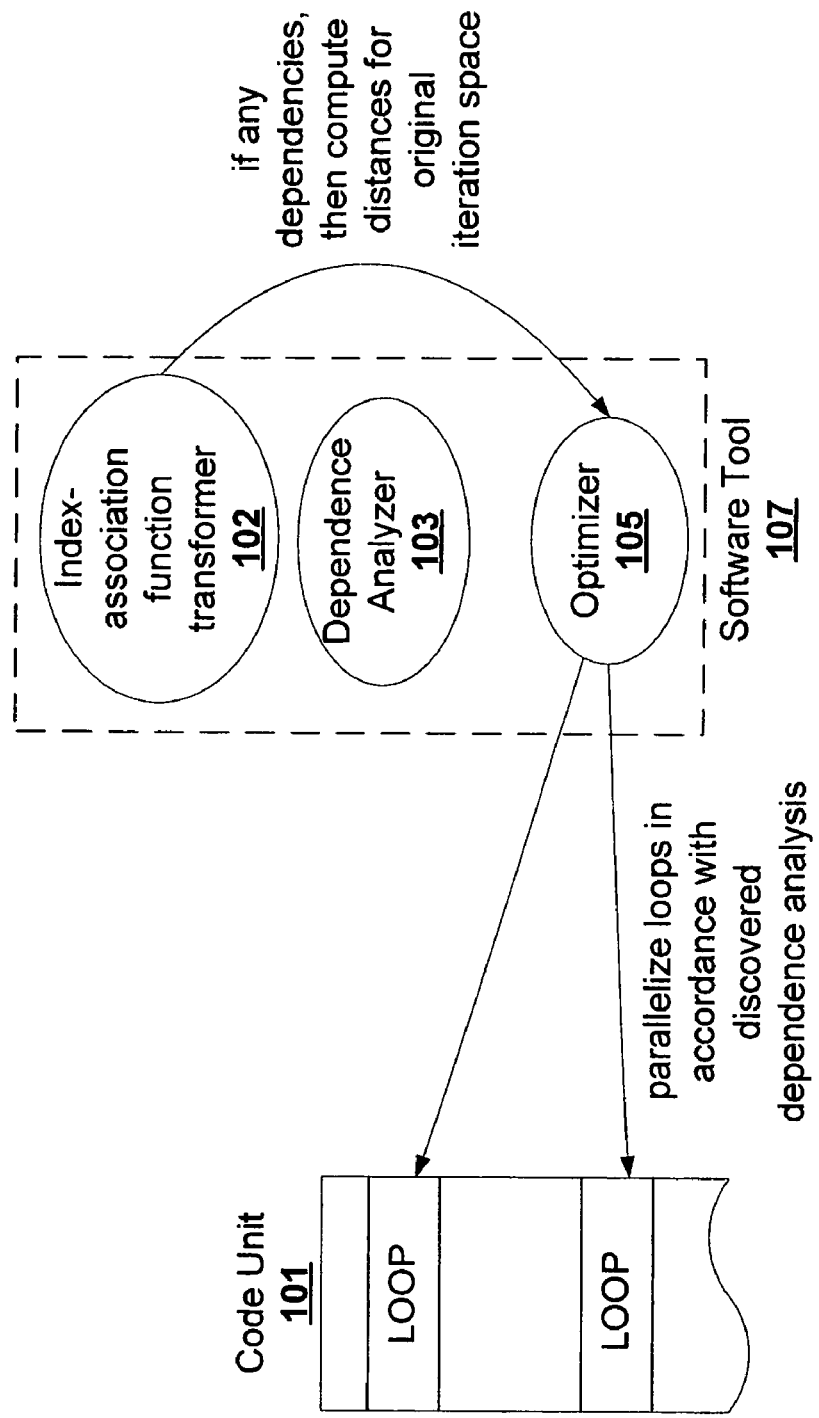

FIGS. 1A-1B depict an exemplary software tool that performs index-association based dependence analysis on a code unit. FIG. 1A depicts generation of transformed index-association functions for dependence analysis. A code unit 101 includes 2 loops, each of which encloses a memory reference that is a non-linear function of the enclosing loop index. The following exemplary codes are examples of loops that enclose memory references, each of which are non-linear functions of their corresponding enclosing loop index.

| Loop A | Loop B | Loop C |
|---|---|---|
| Do I-1, N | Do I-1, N, 2 | Do I-1, N, 2 |
| J=DIV(I, 2) | J=DIV(I, 2) | J=DIV(I, 2) |
| A[J]=5*J | A[J]=A[J+2] | A[J]=A[J+1+N/2] |
| End Do | End Do | End Do |

In the above code examples, the step in Loop A is an implied 1, while the step in each of Loop B and Loop C is 2. The loop index in each of the example loops is I. The memory reference index in each of the code examples is J (i.e., the array A, which represents a memory location, is indexed with J). The index-association function for each of the code examples is the same: DIV(I, 2).

A software tool 107 includes an index-association function transformer 102, a dependence analyzer 103, and an optimizer 105. Each of these functional components of the software tool 107 may be implemented differently (e.g., each functional component implemented as a separate tool, the index-association function transformer 102 implemented separately from the dependence analyzer 103 and the optimizer 105, the optimizer 105 implemented separately from the dependence analyzer 103 and the index-association function transformer 102, etc.). The index-association function transformer 102 processes the loops, constructs a dependence test iteration space, and expresses the non-linear function as a set of linear functions. In FIG. 1A, the index-association function transformer 102 generates transformed index-association function(s) 109.

Construction of a Dependence Test Iteration Space

Table 1 below indicates a paradigm for constructing dependence test iteration spaces based on the index-association function.

TABLE 1

Paradigm for Constructing Dependence Test Iteration Space

| Operator | Index-Association Function | Iteration Space |
|---|---|---|
| Addition | f(I) + c | (l + c, u + c, s) |
| Subtraction | f(I) − c | (l − c, u − c, s) |
| Multiplication | c*f(I) | (l*c, u*c, s) |
| Division | f(I)/c | (l/c, u/c, (⌊s/c⌋, ⌈s/c⌉)) |
| Modulo | Mod(f(I), c) | (Mod(l,c), Mod(u,c), (s,_others_)) |

Table 1 illustrates basic iteration space mapping from original iteration space to dependence test iteration space, assuming the iteration space for $f(I)$ is (l, u, s). The original iteration space can be viewed as an n-dimensional space. For dimension k ($1<=k<=n$), we have a constraint ($L_k$, $U_k$, $S_k$), where $L_k$ is the lower bound, $U_k$ is the upper bound, and $S_k$ is the step value. For division, two different steps may result. For modulo, some negative steps may appear because of the wrap-around nature of the function. These negative steps are represented by_others_in Table 1. Because it may potentially generate many negative step values for a modulo operator, a condition is often generated considering the relation between u−l+1 and c (in Table 1), in order to limit the number of negative steps.

To construct the dependence test iteration space, a software tool (e.g., a compiler) analyzes the index-association functions. The dependence test iteration space is computed by recursively computing the iteration space for sub-expressions of $f_k(I_p)$ ($1<=p<=n$), starting with $I_p$ and ending with $f_k(I_p)$. Table 1 considers an index-association function $f_k$ that takes one original loop index as an argument. However, a dependence test iteration space can be constructed for a function that has more than one enclosing loop index as an argument. For example, assume the index-association function $f_k(I_1, I_2)=DIV(I_1,2)+2*I_2$. The function $f_k$ can be decomposed into two separate functions $f_{k1}=DIV(I_1, 2)$ and $f_{k2}=2*I_2$, giving $f_k(I_1, I_2)=f_{k1}(I_1)+f_{k2}(I_2)$. Hence, a dependence test iteration space can be constructed for an index-association function with multiple loop indices as arguments. The dependence test iteration space for the example would be ($L_1/2+2*L_2$, $U_1/2+2+U_2$, (⌊$S_1/2$⌋, ⌈$S_1/2$⌉)+$S_2*2$) {IS THIS CORRECT?}. Furthermore, a dependence test iteration space can be constructed for an index-association function that is composed of multiple operators by recursively constructing the dependence test iteration space. For example, if the index-association function is $C_1*f(I)+C_2$, then the dependence test iteration space would be ($C_1*L+C_2$, $C_1*U+C_2$, $C_1*S+C_2$).

Given the original iteration space for the above exemplary codes, the software tool 107 attempts to construct the corresponding dependence test iteration space for $J_k=f_k(I_p)$ ($1<=k<=m, 1<=p<=n$), with a form ($l_k$, $u_k$, $s_k$), where J is the memory reference index, $l_k$ is the lower bound, $u_k$ is the upper bound, and $s_k$ is the step. If the loop $I_p$ has a lower bound $L_p$ and an upper bound $U_p$, then index associations or mappings would be $l_k=f_k(L_p)$ and $u_k=f_k(U_p)$. The step $s_k$ represents the difference between two $J_k$ values mapped from two adjacent $I_p$ values (note that $s_k$ could have multiple values and could be 0). Such a mapping between original iteration space and dependence test iteration space would guarantee that dependence exists in the dependence test iteration space if and only if it exists in the original iteration space.

It is possible to have different $J_k$ associated with the same $I_p$ such as $J_{k1}=f_{k1}(I_p)$ and $J_{k2}=f_{k2}(I_p)$. The coupling relation of $J_{k1}$ and $J_{k2}$ will be lost in the dependence test iteration space, which will introduce challenges when the dependence distance in the dependence test iteration space is mapped back to the original iteration space. For such cases, if functions $f_{k1}$ and $f_{k2}$ are both linear forms, forward substitution will be performed for these functions and express a single $J_k=I_p$ as the index-association function. Otherwise, dependence analysis in the dependence test iteration space can still be performed. However, precision of the computed dependence distance in the original iteration space may be impacted.

With regard to the above exemplary code, the original iteration space for Loop A is (1, N, 1). The dependence test iteration space for Loop A is (0,N/2, s), where the step s is variant with a value of 0 or 1. For each of Loops B and C, the original iteration space is (1, N, 2). The dependence test iteration space for each of Loops B and C is (0, N/2, 1).

Dependency Analysis

With the transformed index-association function(s) 109 and the constructed dependence test iteration space, the dependence analyzer 103 determines any dependencies. If the index-association function is linear, then traditional techniques can be applied for dependence analysis. However, if the dependence test iteration space has multiple step values in certain dimensions, traditional techniques assume a step value which is the greatest common divisor of all possible step values, and possibly conservatively get the result where the dependence exists. Given a pair of references, there are three possible results from the dependence test in the dependence test iteration space. If no dependencies exist in the dependence test iteration space, then there will be no dependence in the original iteration space. If a dependence exists with a distance d in the dependence test iteration space, then the dependence distance in the original iteration space is computed based on d and the property of index-association functions. If a dependence exists with an unknown distance in the dependence test iteration space, it is simply regarded as an unknown distance dependence in the original iteration space.

Referring again to the exemplary code examples above, in Loop A, because the step can have a value of 0, the dependence distance from A[J] to itself could be 0 in the dependence test iteration space. In Loop B and Loop C, however, a dependence does not exist from A[J] to itself in the dependence test iteration space. In Loop B, a dependence exists from A[J+2] to A[J] with distance 2 in the dependence test iteration space. In Loop C, because the dependence test iteration space for J is (0, N/2, 1), it can be determined that no dependencies exist between A[J] and A[J+1+N/2] in the dependence test iteration space.

Mapping Dependence Distances Between the Constructed Dependence Iteration Space and the Original Iteration Space FIG. 1B depicts an exemplary optimizer optimizing loops of a code unit based on index-association based dependence analysis. For those dependencies found by the dependence analyzer 103 in the dependence test iteration space, the index-association function transformer 102 maps the dependence distances in the dependence test iteration space back to the original iteration space. Given a dependence distance in the dependence test iteration space, the property of index-association functions are analyzed in order to get the proper dependence distance in the original iteration space. Given the dependence distance in the dependence test iteration space, Table 2 below illustrates how to compute the dependence distance based on index-association functions.

TABLE 2

Paradigm for Computing Dependence Distance in Original Iteration Space from Dependence Distances in Dependence Test Iteration Space

| Operator | Original Expression | Original Distance | New Expression | New Distance |
|---|---|---|---|---|
| Addition | f(I) + c | d | f(I) | d |
| Subtraction | f(I)-c | d | f(I) | d |
| Multiplication | f(I)*c | d | 1(I) | d/c if MOD (d,c)=0, no dependence otherwise |
| Division | f(I)/c | d | f(I) | (d*c-c+1,..., d*c + c-1) |
| Modulo | MOD(f(I),c) | d | f(I) | d |

The dependence distance in the original iteration space is computed by recursively computing the distance for the sub-expression of $J_k=f_k(I_p)$ ($1<=k<=m$, $1<=p<=n$), starting with $f_k(I_p)$ and ending with $I_p$. Of note are the distance mappings for multiplication and division. If a dependence exists between the iterations $i_1$ and $i_2$, then for multiplication, $c*f(i_1)-c*f(i_2)=c*(f(i_1)-f(i_2))=d$. If MOD(d,c)=0, then $f(i_1)-f(i_2)=d/c$ can be derived. Otherwise, no dependence exists between $f(i_1)$ and $f(i_2)$. Given the same assumption of dependence between $i_1$ and $i_2$, then for division $f(i_1)/c-f(i_2)/c=d$. The range of $f(i_1)$ and $f(i_2)$ is to be determined. Through mathematical manipulation, $d*c-c+1<=f(i_1)-f(i_2)<=d*c+c-1$ for general cases, as illustrated in Table 2. For certain cases, however, a more precise result can be attained. For example, if MOD(f(i),c) is always equal to 0, then the distance for f(I) would be solely $(f(i_1)-f(i_2))/c$.

Dependence distance mappings in accordance with Table 2 are illustrated using the exemplary Loops A, B, and C. In Loop A, there exists a dependence from A[J] to itself with a distance 0 in the dependence test iteration space. Because of the index-association function DIV(I,2), the corresponding distance in the original iteration space is 0 or 1 (the −1 is an illegal distance and is ignored). In Loop B, there exists a dependence from A[J+2] to A[J] with a distance 2 in the dependence test iteration space. Because of the index-association function DIV(I,2), the corresponding distance in the original iteration space would be 3 or 4 or 5.

The optimizer 105 utilizes the dependence distances in the original iteration space to parallelize the loops of the code unit 101.

Exemplary Flowcharts for Index-Association Based Dependency Analysis

Figure 2:
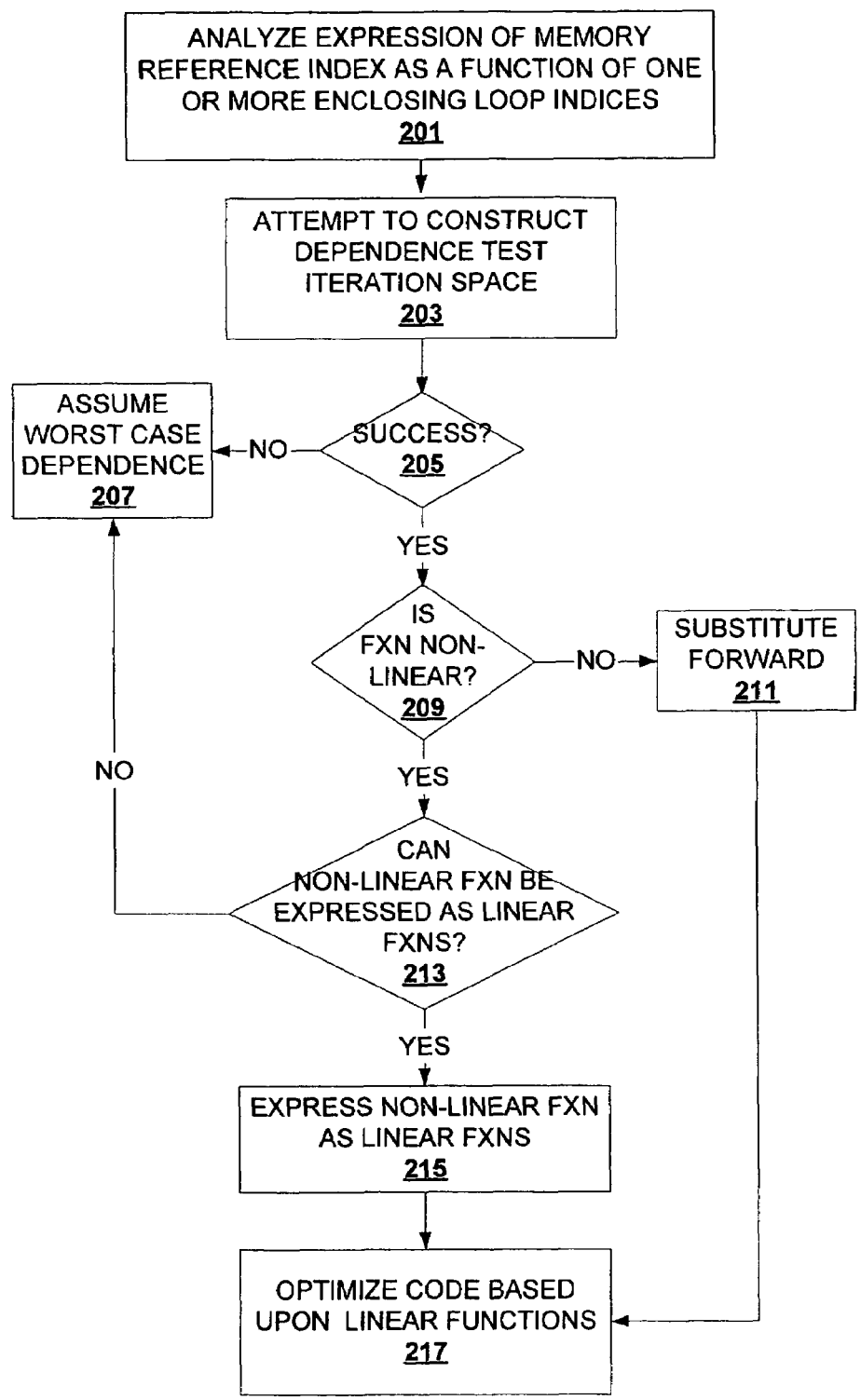
FIG. 2 depicts an exemplary flowchart for index-association based dependence analysis.

FIG. 2 depicts an exemplary flowchart for index-association based dependence analysis. At block 201, an expression of a memory reference index as a function of one or more enclosing loop indices is analyzed. At block 203, construction of a dependence test iteration space is attempted. At block 205, it is determined if the attempt to construct the dependence test iteration space is successful. If the construction attempt is successful, then control flows to block 209. If the construction attempt is not successful (i.e., the dependence test iteration space cannot be constructed), then control flows to block 207.

At block 207, the worst case dependence is assumed (i.e., it is assumed that dependencies exist which prohibit parallelizing the loop).

At block 209, it is determined if the expression of the memory reference index is a non-linear function. If the function is non-linear, then control flows to block 213. If the function is linear, then control flows to block 211.

At block 211, index association is performed based on forward substitution of the loop index into the memory reference. Control flows from block 211 to block 217.

At block 213, it is determined if the non-linear expression of the memory reference (i.e., the index-association function) can be expressed as linear functions. If the non-linear index-association function can be expressed as linear functions, then the number of linear functions, t, can be determined. If the index-association function can be expressed as linear functions, then control flows to block 215. If the index-association function cannot be expressed as linear functions, then control flows to block 213.

At block 215, the non-linear index-association function is expressed as linear functions. At block 217, the code that includes the enclosing loop is optimized based upon the linear functions and constructed dependence test iteration space.

Figure 3:
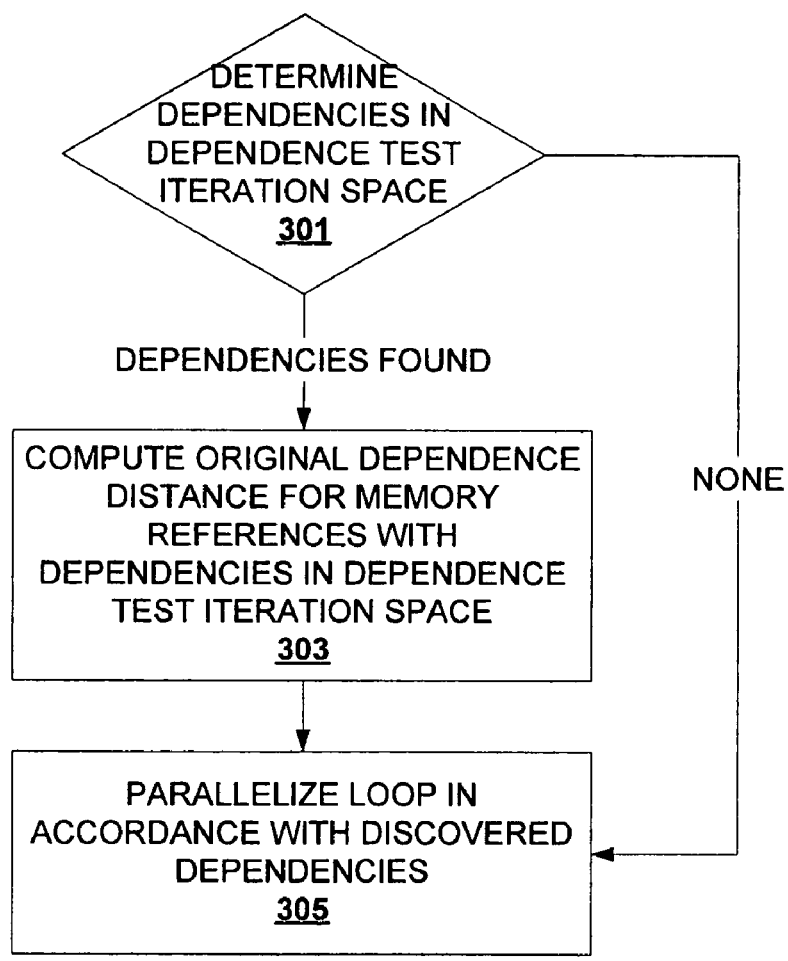
FIG. 3 depicts an exemplary flowchart for optimizing code in accordance with index-association based dependence analysis.

FIG. 3 depicts an exemplary flowchart for optimizing code in accordance with index-association based dependence analysis. At block 301, it is determined whether dependencies exist in a dependence test iteration space. If dependencies do not exist in the dependence test iteration space, then dependencies do not exist in the original iteration space and control flows to block 305. If dependencies exist in the dependence test iteration space, then dependencies exist in the original iteration space, and control flows to block 303. At block 303, dependence distances in the original iteration space are computed for memory references pairs with dependencies in the dependence test iteration space. At block 305, the enclosing loop is parallelized in accordance with the discovered dependencies.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example, blocks 207, 211, and 217 may be performed separate from the rest of FIG. 2, with the executing software tool either exiting at these blocks and/or passing indications of the result of the operations to another software tool or application.

With index-association based dependence analysis, code with memory references previously considered too complex for accurate or precise dependence analysis can now be optimized. Hence, application performance can be improved with index-association based dependence analysis. The following illustrates application of index-association based dependence analysis to a memory reference expressed as a non-linear function with a division.

Dependence Analysis with Division

The limitations of traditional dependence analysis techniques can be overcome by expressing non-linear index-association functions as linear functions. These linear expressions are used during dependence testing with traditional dependency analysis techniques. Specifically, we want to find a set of linear expressions which are equivalent to $J=f(I)$, where the index I has the iteration space (L, U, S) and the function $f$ contains operations such as addition, subtraction, multiplication and division.

Without losing generality, we assume $U \geq L$ and $S>0$. Let t be the loop trip count for loop I, and we have $$t = \frac{U - L + S - 1}{S}.$$

Let $i_1, i_2, \ldots i_t$ represents the t loop index I values, from the smallest one to the largest one. Let $j_p = f(i_p), 1 \leq p \leq t$, as the corresponding J index values.

First, let us study the following exemplary loop.

Do I=1, 100, 3
J=5*I/4
A[J+9]=A[J]+1
End Do

We want to express J=5*I/4 as a set of linear expressions. For the I value sequence (1, 4, 7, 10, 13, 16, 19, 22, ..., 97, 100), the corresponding J value sequence is (1, 5, 8, 12, 16, 20, 23, 27, ..., 121, 125). Clearly, the J value sequence is not a linear sequence because the difference between adjacent values vary. However, note that the difference between every $p^{th}$ and $(p+4)^{th}$ J values (1=p=t−4) is a constant of 15. Therefore, the original J value sequence can be represented as 4 linear sequences, each with a step of 15 and initial value, 1, 5, 8 and 12 respectively.

To generalize the above observation, for a sequence of J values $j_p$ (1=p=t), we want to find t, the number of linear expressions needed to represent $j_p$ and s, the step value for each individual linear expression.

The steps between the J value sequence can be expressed as:

$$js_1 = j_2 - j_1 = f(i_2) - f(i_1)$$

$$js_2 = j_3 - j_2 = f(i_3) - f(i_2)$$

$$\ldots$$

$$js_{t-1} = j_t - j_{t-1} = f(i_t) - f(i_{t-1})$$

With the semantics of t, we have $js_p = js_{p+\tau}, \forall 1 \leq p, p+\tau, \leq t-1$, holds. This is equivalent to:

$$f(i_{p+1}) - f(i_p) = f(i_{p+\tau+1}) - f(i_{p+\tau}), 1 \leq p, p+\tau \leq t-1 \quad (1)$$

Different $f$ may require different complexities to compute t. Conservative method can also be applied if the compiler is not able to do sophisticated analysis and manipulation. The compiler can make the worst assumption if it can not find a compiler-time known constant t, e.g., turning to the index-association based dependence analysis as already described above.

Now suppose t is available, for each linear expression, we can easily compute the corresponding step as $$\sigma = f(i_{p+\tau}) - f(i_p), 1 \leq p, p+\tau \leq t-1. \quad (2)$$

We do not try to construct the trip count for different linear expressions and rather conservatively assume a trip count which equals to that for the linear expression with the initial value of $f(L)$, which also has the maximum trip count over all t linear expressions.

With t and s available, the $J=f(I)$ can be expressed as:

$$J = \tau * I' + r' \quad (3)$$

where I' is an integer variable and its iteration space is $$\left(0, \left\lceil \frac{f(i_t) - f(i_1)}{\sigma} \right\rceil, 1\right),$$

and r' is a set of t discrete numbers $\{f(i_p)|1 \leq p \leq \tau\}$.

Since the set of linear expressions is equivalent to the original non-linear expression, whether a dependence exists with the original non-linear expression can be determined by whether a dependence exists with the transformed set of linear expressions. For any dependence distance value d (regarding loop index I') computed with transformed linear expressions, the dependence distance in the original I iteration space can be computed based on d and the difference between corresponding r'.

As an example, we now show how we compute the t and s for the expression $J=f(I)=C*I/D$.

$$f(i_{p+1}) - f(i_p) = f(i_{p+\tau+1}) - f(i_{p+\tau})$$

$$\frac{C*(L+P*S)}{D} - \frac{C*(L+(P-1)*S)}{D} =$$

$$\frac{C*(L+(P+\tau)*S)}{D} - \frac{C*(L+(P+\tau-1)*S)}{D} \Leftrightarrow$$

$$\frac{C*(L+P*S)}{D} - \frac{C*(L+(P-1)*S)}{D} =$$

$$\frac{C*(L+P*S) + C*\tau*S}{D} - \frac{C*(L+(P-1)*S) + C*\tau*S}{D}$$

If $C*t*S$ is divisible by D, the above equation will hold. To make $C*t*S$ is divisible by D, we can let $$\tau = \frac{D}{GCD(C*S, D)}$$

where GCD(C*S,D) represents the greatest common divisor of C*S and D.

Now, we show how our technique can determine whether the dependence exists between A(J+9) and A(J) in the exemplary loop (above), whether there exist any instances of J, say $j_1$ and $j_2$, and $$j_1 + 9 = j_2 \qquad (4)$$

has a solution.

With our technique, the non-linear expression $J=5*I/4$, where loop I's iteration space is (1, 100, 3), can be represented equivalently by $$J = 15*I' + r', r' = (1,5,8,12), I' \text{ has iteration space } (0,8,1) \qquad (5)$$

Using the linear expression (5), the equation (4) is equivalent to $$15*i_1 + r_1 + 9 = 15*i_2 + r_2. \qquad (6)$$

where $i_1$ and $r_1$ for $j_1$, and $i_2$ and $r_2$ for $j_2$.

To consider whether equation (6) has a solution or not, we have $$15*(i_1 - i_2) = (r_2 - r_1) - 9$$

$$-\{1,5,8,12\} - \{1,5,8,12\} - 9$$

$$-\{-11,-7,-4,0,4,7,11\} - 9$$

$$-\{-20,-16,-13,-9,-5,-2,2\}$$

All possible values on the right-hand side are not divisible by 15, so there exists no solution for (4) and no dependence between A[J+9] and A[J]. Therefore, the exemplary loop can be parallelized successfully.

Index-association based dependence distance can help both general loop transformations and automatic parallelization because it tries to provide more accurate dependence test result.

Collapsing Loops

Index-association based dependence analysis can help determine whether a loop, with some non-linear index-association functions, is a DOALL loop (i.e., loop with independent iterations) or not. For non-DOALL loops, previous techniques can generate run-time conditionals under which the non-DOALL loop will become a DOALL loop, to guard the parallelized code. Combining index-association based dependence analysis with dynamic parallelization, allows parallelization of some otherwise hard-to-parallelize loops. For example, the following code example (the original code), which could not be parallelized with conventional compilers, could be parallelized with one or more software tools, such as a compiler, implemented to perform dynamic parallelization and index-association based dependence analysis.

```
Do I₁=L₁,U₁
  Do I₂=I₁*C₁, (I₁+1)*C₁-1, S₂
    J=DIV(I₂,C₂)
    A[J]= ...
    A[J+1]= ...
    ...
    A[J+C₃]= ...
  End Do
End Do
```

In the original code, $C_2$, $C_3$ and $S_2$ are all compile-time known constants and $C_1$ is a loop nest invariant. In the original code, it is assumed that all right-hand sides of assignments A[J+k]= ... (0<=k<=$C_3$) do not contain references to the memory location identified with the array A. The original iteration space for loop $I_2$ is $(I_1*C_1, (I_1+1)*C_1, S_2)$. With the property of index-association function DIV, we can derive the dependence test iteration space (corresponding to the original loop $I_2$) as $$\left(\left\lfloor \frac{I_1 C_1}{C_2} \right\rfloor, \left\lfloor \frac{(I_1+1)*C_1}{C_2} \right\rfloor, \left(\left\lfloor \frac{S_2}{C_2} \right\rfloor, \left\lceil \frac{S_2}{C_2} \right\rceil\right)\right)$$

(based on the dependence test iteration space construction paradigm illustrated in Table 1), where the step is variant with either $$\left\lfloor \frac{S_2}{C_2} \right\rfloor \text{ or } \left\lceil \frac{S_2}{C_2} \right\rceil.$$

Therefore, if the condition $$C_3 < \left\lfloor \frac{S_2}{C_2} \right\rfloor$$

holds, then the loop $I_2$ is parallelizable.

However, parallelizing the outer loop $I_1$ calls for more analysis. Analyzing the loop bounds and steps allows the aforementioned exemplary compiler to determine if the condition $MOD(C_1, S_2)=0$ holds (i.e., if $C_1$ is divisible by $S_2$, then the loops $I_1$ and $I_2$ actually can be collapsed into one loop. The following code is an exemplary illustration of the original code after loop collapsing.

If ($MOD(C_1, S_2)=0$) Then
  Do $I_3 = L_1 * C_1$, $(U_1+1)*C_1-1$, $S_2$
    J=DIV($I_3, C_2$)
    A[J]= . . .
    A[J+1]= . . .
    . . .
    A[J+C3]= . . .
  End Do
Else
  Do $I_1 = L_1, U_1$
  Do $I_2 = I_1 * C_1$, $(I_1+1)*C_1-1$, $S_2$
    J=DIV($I_2, C_2$)
    A[J]= . . .
    A[J+1]= . . .
    . . .
    A[J+C3]= . . .
  End Do
End Do The new loop $I_3$ can be further parallelized if the condition $$C_3 < \left\lfloor \frac{S_2}{C_2} \right\rfloor$$

continues to hold, as already described, when applied to the above new code with the collapsed loop $I_3$. The following is the final code with the collapsed loop $I_3$ parallelized under the conditions $MOD(C_1, S_2)=0$ and $$C_3 < \left\lfloor \frac{S_2}{C_2} \right\rfloor.$$

Hence, a software tool, such as a compiler, that performs index-association based dependence analysis and that dynamically parallelizes code can successfully achieve the final code below from the original code.

If (($MOD(C_1, S_2)=0$) And $$\left( C_3 < \left\lfloor \frac{S_2}{C_2} \right\rfloor \right)$$

Then
  Do $I_3 = L_1 * C_1$, $(U_1+1)*C_1-1$, $S_2$
    J=DIV($I_3, C_2$)
    A[J]= . . .
    A[J+1]= . . .
    . . .
    A[J+C3]= . . .
  End Do
Else
  Do $I_1 = L_1, U_1$
  Do $I_2 = I_1 * C_1$, $(I_1+1)*C_1-1$, $S_2$
    J=DIV($I_2, C_2$)
    A[J]= . . .
    A[J+1]= . . .
    . . .
    A[J+C3]= . . .
  End Do
End Do The above described techniques may be exploited in combination with approaches described herein and/or may be used in combination with more traditional techniques to facilitate dependence analysis in the face of loop constructs in which storage locations are addressed using non-linear functions of an enclosing loop index.

The described invention may be provided as a computer program product, or software, that may include a machine-readable medium having stored thereon instructions, which may be used to program a computer system (or other electronic devices) to perform a process according to the present invention. Those of ordinary skill in the art will appreciate that instructions implementing the described invention may be implemented differently (e.g., different sequences of instructions, implemented as different files, such as library files, bytecode files, class files, etc.). A machine readable medium includes any mechanism for storing or transmitting information in a from (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other type of medium suitable for storing electronic instructions.

Figure 4:
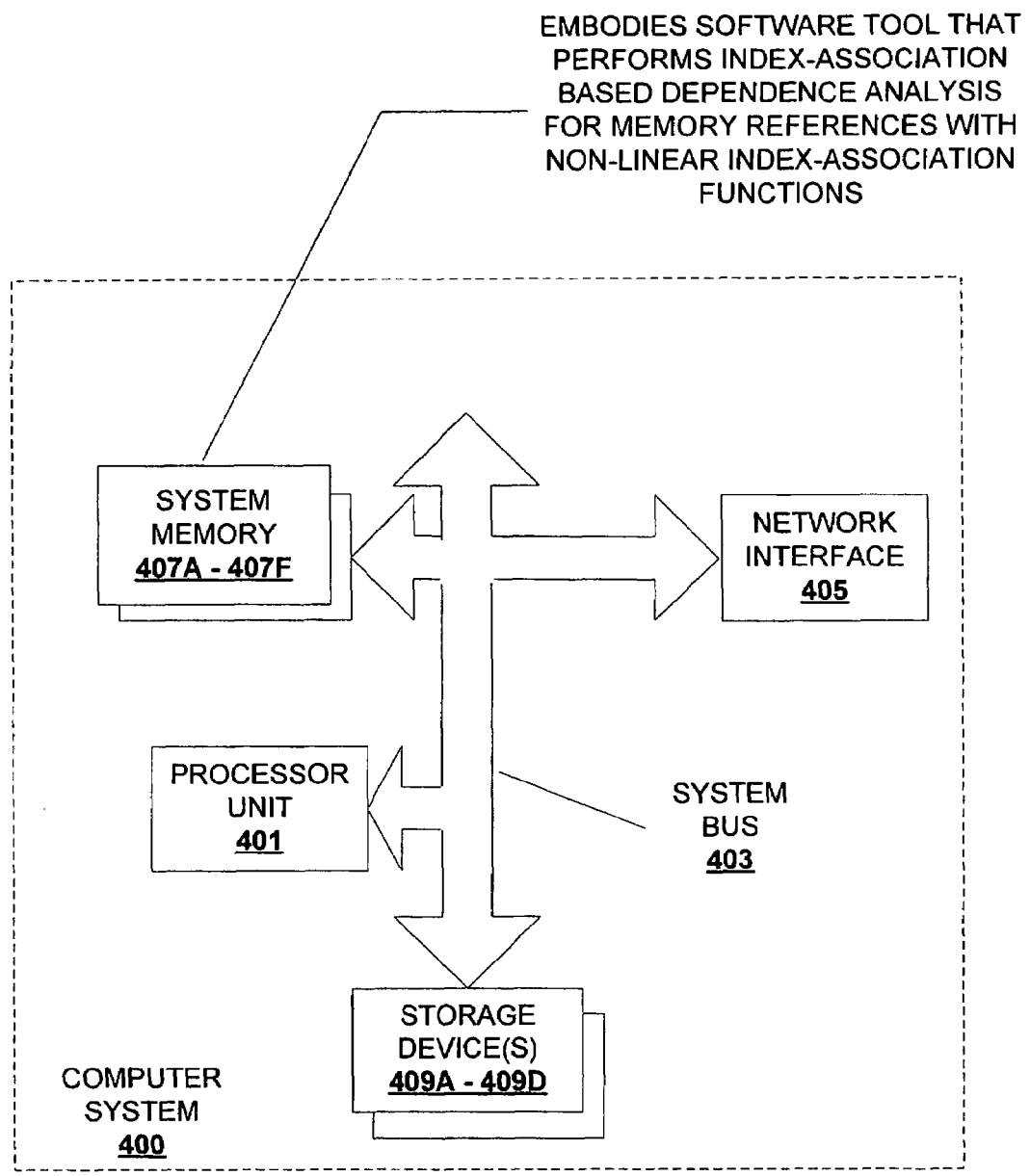
FIG. 4 depicts an exemplary computer system according to realizations of the invention.

FIG. 4 depicts an exemplary computer system according to realizations of the invention. A computer system 400 includes a processor unit 401 (possibly including multiple processors). The computer system 400 also includes a system memory 407A-407F (e.g., one or more of cache, SRAM DRAM, RDRAM, EDO RAM, DDR RAM, EEPROM, etc.), a system bus 403 (e.g., LDT, PCI, ISA, etc.), a network interface 405 (e.g., an ATM interface, an Ethernet interface, a Frame Relay interface, etc.), and a storage device(s) 409A-409D (e.g., optical storage, magnetic storage, etc.). Realizations of the invention may include fewer or additional components not illustrated in FIG. 4 (e.g., video cards, audio cards, additional network interfaces, peripheral devices, etc.). The processor unit 401, the storage device(s) 409A-409D, the network interface 405, and the system memory 407A-407F are coupled to the system bus 403. In FIG. 4, the system memory 407A-407F is illustrated as embodying a software tool that performs index-association based dependence analysis. In particular, the software tool performs index-association based dependence analysis for memory references with non-linear index-association functions, as previously described herein. The software tool may be embodied completely or partially within the system memory 407A-407F, the processor unit 401, another processor unit, etc. In addition, separate sequences of instructions (e.g., software modules) may perform one or more of constructing a dependence test iteration space, transforming a non-linear function into linear functions, analyzing the constructed dependence test iteration space for dependencies, and mapping dependency distances from the dependence test iteration space back to the original iteration space.

While the invention has been described with reference to various embodiments, it will be understood that these embodiments are illustrative and that the scope of the invention is not limited to them. Many variations, modifications, additions, and improvements are possible. For example, while compiler facilities have been used as a descriptive context, the invention is not limited thereto. Indeed, the other executable code generators including just-in-time compilers, binary translators, etc. may be employed. More generally, plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A method of identifying cross-iteration dependence of code that includes at least two loops with an enclosing loop enclosing an enclosed loop and generating executable code based thereon, the method comprising:

for the enclosing loop that includes at least two indexed accesses to storage, wherein at least one of the indexed accesses is a write access and wherein at least one of the indexed accesses indexes the storage using an index-association function that is a non-linear function of the enclosing loop index, generating a set of linear expressions equivalent to the non-linear function;

evaluating, using the equivalent set of linear expressions, whether any index instance for the write access coincides with an index instance for any other access to the storage;

evaluating, using the equivalent set of linear expressions, whether any index instance for the write access coincides with an index instance for any other access to the storage;

parallelizinq the enclosing loop if, based on the evaluating, no dependence exists between the two indexed accesses to storage; and generating executable code corresponding to the parallelized loop.

2. The method of claim 1, wherein the at least two indexed accesses to storage are write accesses.

3. The method of claim 1, wherein the non-linear function includes a division operator over the enclosing loop index.

4. The method of claim 1, wherein the non-linear function includes at least one of addition, subtraction, multiplication and division over the enclosing loop index and one or more region constants.

5. The method of claim 1, further comprising:

conditionally parallelizing the enclosing loop if, based on the evaluating, a condition exists for which dependence exists between the two indexed accesses to storage.

6. The method of claim 1, further comprising:

transforming the enclosing loop based on the evaluating.

7. The method of claim 1, wherein the mapping includes:

identifying a number of the linear expressions, t, to represent the non-linear expression;

identifying a set of t initial values, one for each of the linear expressions; and identifying an iteration space for the mapped set of linear expressions.

8. The method of claim 1, wherein the evaluating includes:

substituting the mapped set of linear expressions into an equality relation corresponding to the two indexed accesses to storage; and if no solution exists for the substituted equality relation, then determining that no dependence exists between the two indexed accesses to storage.

9. The method of claim 8, wherein the evaluating further includes:

identifying a condition under which the no dependence exists between the two indexed accesses to storage.

10. The method of claim 1, wherein the storage is organized as an array and the index instances are indices thereinto.

11. The method of claim 1, wherein the two indexed accesses to storage appear in a same statement within the enclosing loop.

12. The method of claim 1, wherein the two indexed accesses to storage appear different statements within the enclosing loop.

13. The method of claim 1, embodied in operation of one of a compiler and an optimizer.

14. A code preparation facility comprising:

a processor configured to parallelize a loop of code that includes at least two loops with an enclosing loop enclosing an enclosed loop, the enclosing loop including at least two indexed accesses to storage, wherein at least one of the indexed accesses is a write access and wherein at least one of the indexed accesses indexes the storage using an index-association function that is a non-linear function of the enclosing loop index, by generating a set of linear expressions equivalent to the non-linear function, configured to evaluate, using the equivalent set of linear expressions, whether any index instance for the write access coincides with an index instance for any other access to the storage, the parallelizing of the loop being based on the evaluating and being performed when no dependence exists between the two indexed accesses to storage, and configured to generate executable code corresponding to the parallelized loop.

15. The code preparation facility of claim 14, wherein the non-linear function includes a division operator over the enclosing loop index.

16. The code preparation facility of claim 14, wherein the non-linear function includes at least one of addition, subtraction, multiplication and division over the enclosing loop index and one or more region constants.

17. The code preparation facility of claim 14, wherein the processor comprises a compiler.

18. A machine-readable medium embodied as a tangible object with a physical structure, the medium encoded with instructions for parallelizing a loop of code that includes at least two loops with an enclosing loop enclosing an enclosed loop, the enclosing loop including at least two indexed accesses to storage, wherein at least one of the indexed accesses is a write access and wherein at least one of the indexed accesses indexes the storage using an index-association function that is a non-linear function of the enclosing loop index, the instructions, when executed by a machine, causing the machine to perform operations including:

generating a set of linear expressions equivalent to the non-linear function;

evaluating, using the equivalent set of linear expressions, whether any index instance for the write access coincides with an index instance for any other access to the storage;

parallelizing the enclosing loop based on the evaluation; and generating executable code corresponding to the parallelized loop.

19. The machine-readable medium of claim 18, wherein the expression includes a division operation on the enclosing loop index.

20. The machine-readable medium of claim 18, wherein the expression includes at least one of addition, subtraction, multiplication, and modulo.

21. A method of making a computer program product:
reading a source representation of program code that includes at least two loops with an enclosing loop enclosing an enclosed loop, wherein the enclosing loop includes at least two indexed accesses to storage, wherein at least one of the indexed accesses is a write access and wherein at least one of the indexed accesses indexes the storage using an index-association function that is itself a non-linear function of the enclosing loop index;
expressing the non-linear function expression to a corresponding set of linear expressions;
evaluating, using the corresponding set of linear expressions, whether any index instance for the write access coincides with an index instance for any other access to the storage;
parallelizing the enclosing loop if, based on the evaluating, no dependence exists between the two indexed accesses to storage; and
generating executable code corresponding to the parallelized loop and encoding same in the computer program product.

22. The method of claim 21 further comprising collapsing a plurality of nested loops into the enclosing loop.

23. The method of claim 21, wherein the set of linear expressions are equivalent to the non-linear function.

24. A method comprising:
based on a first iteration space of a loop index, constructing a second iteration space for a memory reference index that is a non-linear function of the loop index, wherein the loop encloses the memory reference index;
expressing the memory reference index as a set of linear functions equivalent to the non-linear function;
utilizing the equivalent set of linear functions for dependence analysis in the second iteration space to evaluate whether any index instance for the write access coincides with an index instance for any other access to the storage;
parallelizing the enclosing loop if, based on the evaluating, no dependence exists between the two indexed accesses to storage; and
generating executable code corresponding to the parallelized loop.

25. The method of claim 24 further comprising mapping discovered dependencies in the second iteration space back to the first iteration space.

26. The method of claim 24 further comprising:
determining whether the non-linear function can be expressed as linear functions; and
assuming a worst case dependence for the loop if the non-linear function cannot be expressed as linear functions.

27. The method of claim 24 further comprising:
determining whether the second iteration space can be constructed; and assuming a worst case dependence for the loop if the second iteration space cannot be constructed.

28. The method of claim 24, wherein the memory reference index is a nonlinear function of the loop index and an index of a second loop that encloses the loop.

29. The method of claim 28 further comprising expressing the memory reference index as a set of non-linear functions and expressing each of the set of nonlinear functions with corresponding equivalent sets of linear functions.

* * * * *